(No Model.)

C. T. STETSON.
MANUFACTURE OF METALLIC SHANKS FOR BOOTS AND SHOES.

No. 339,117. Patented Mar. 30, 1886.

Witnesses
M. A. Thompson
Robert Wallace

Inventor
Charles T. Stetson,
by Wm. H. Macleod,
his Atty.

UNITED STATES PATENT OFFICE.

CHARLES T. STETSON, OF ROCKLAND, ASSIGNOR OF ONE-HALF TO OSCAR W. WHITCHER, OF HYDE PARK, FRANK W. WHITCHER, OF BOSTON, AND J. HENRY EMERY, OF QUINCY, MASSACHUSETTS.

MANUFACTURE OF METALLIC SHANKS FOR BOOTS AND SHOES.

SPECIFICATION forming part of Letters Patent No. 339,117, dated March 30, 1886.

Application filed January 23, 1886. Serial No. 189,439. (No model.)

*To all whom it may concern:*

Be it known that I, CHARLES T. STETSON, of Rockland, county of Plymouth, State of Massachusetts, have invented certain new and useful Improvements in the Manufacture of Metallic Shanks for Boots and Shoes, of which the following is a full, clear, concise, and exact description, reference being had to the drawings accompanying and forming a part hereof, in which—

Figure 1:
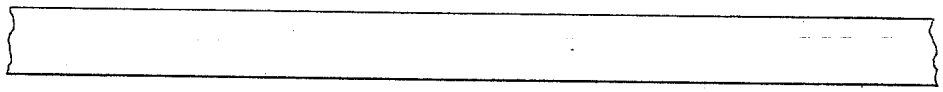
Figure 2:
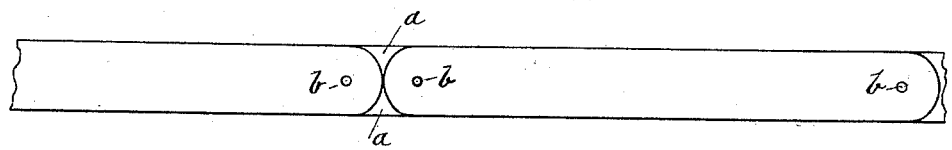
Figure 3:

Figure 1 shows the strip from which the shanks are cut. Fig. 2 shows the relation which the blanks bear to each other in the strip. Fig. 3 is an edge view of a completed shank.

Hitherto, so far as known to me, metallic shanks have been manufactured from sheets of metal having a width equal to the length of the shank, and the shanks have been struck or cut from this sheet of metal—that is, at right angles to the line in which the sheet of steel is rolled, so that the grain of the metal runs across the shank, and it is necessary in the manufacture of shanks in this manner to employ an expensive quality of steel. This quality is necessary because shanks cut crosswise of the grain from poor steel or steel of common quality have not sufficient spring and durability.

By my improved process steel of common quality may be used, and I cut the rolled sheets into strips the width of a shank, such as are shown in Fig. 1, the strip being cut lengthwise of the grain—that is, in the direction in which the steel is rolled. After these strips are cut from the sheet they are cut into lengths proper for the shanks by cutting from the strip at the proper places a piece of the shape shown at $a$, Fig. 2, which leaves the ends of the shanks rounded, which I prefer, as the shank with a rounded end and without sharp corners does not damage the shoe-sole as the square-cornered shanks in common use do. Of course the strip might be cut directly across by a single cut, so as to leave the shanks square cornered, without essentially varying my improved method.

The holes $b\,b$, by which the shank is secured in the shoe, are punched in the shank, and it is then molded or pressed between concave and convex dies to bend it into proper shape.

The shanks may be cut from the strip in any convenient manner. I prefer, however, to cut and punch the holes and mold them or press them into shape by a machine, which will form the subject of another application for Letters Patent. Shanks made in this manner have all the durability and spring of the shanks now in use, and may be produced at very much less cost.

What I claim is—

The method of manufacturing metallic shanks for boots and shoes, consisting in first cutting the metal into strips of the width of a shank in the direction in which the metal is rolled, then cutting the shank from the strips so formed and punching the securing-hole therein, then bending the shanks so formed to shape, substantially as set forth.

CHARLES T. STETSON.

Witnesses:
    MARY H. BLACKMAN,
    GILES W. HOWLAND.